US005742739A

United States Patent [19]

Albesano et al.

[11] Patent Number: 5,742,739

[45] Date of Patent: Apr. 21, 1998

[54] METHOD OF SPEEDING UP THE EXECUTION OF NEURAL NETWORKS FOR CORRELATED SIGNAL PROCESSING

[75] Inventors: Dario Albesano, Venaria; Roberto Gemello; Franco Mana, both of Turin, all of Italy

[73] Assignee: Cselt - Centro Studi e Laboratori Telecomunicazioni S.P.A., Turin, Italy

[21] Appl. No.: 608,480

[22] Filed: Feb. 28, 1996

[30] Foreign Application Priority Data

Mar. 22, 1995 [IT] Italy .............................. TO95A0216

[51] Int. Cl.$^6$ .............................. G06F 15/18

[52] U.S. Cl. .............................. 395/22; 395/20; 395/21; 395/23; 395/24

[58] Field of Search .............................. 395/20, 21, 22, 395/23, 24

[56] References Cited

U.S. PATENT DOCUMENTS

| | | | |
|---|---|---|---|
| 5,313,558 | 5/1994 | Adams | 395/22 |
| 5,559,811 | 9/1996 | Abramovici et al. | 371/27 |
| 5,565,364 | 10/1996 | Schaefer et al. | 395/22 |

OTHER PUBLICATIONS

Silicon Implementations of Neural Networks; IEE Proceedings–F vol. 138(1991) No. 1, –pp. 3 to 12, Murray, A. F. World Congress on Neural Networks –San Diego; vol. 2; pp. 576 to 583 1994, Kim et al, "An Asynchronous Inter–processor Communication Based".

Proceedings of the 36th Midwest Symposium on Circuits and Systems; Aug. 16 to 18, 1993; pp. 1085 to 1088, Kwan et al, "Multipliers Multilayer Feedword Neural Networks".

The 1994 IEEE International Conference on Neural Networks; pp. 1409 to 1413, Ghorbani et al, "Training Artificial Neural Networks Using Variable Precision Incremental Communication".

"Incremental Communication for Multilayer Neural Networks"; 1995; pp. 1375–1385, Ghorbani et al, IEEE Transaction on Neural Networks.

Tang et al, "Multilayer feed forward Neural Networks with Single Powers–of two weights," IEEE Transactions on Signal Processing, vol. 41, No. 8, Aug. 1993.

*Primary Examiner*—George B. Davis
*Attorney, Agent, or Firm*—Herbert Dubno

[57] ABSTRACT

A method of speeding up the execution of a wide class of neural networks for processing input signals evolving slowly through time, such as, for instance, voice, radar, sonar, video signals, and which requires no specialized, costly or hard-to-find hardware. The method requires storing, for the neurons in at least one level of the network, the activation value at a certain instant and comparing it with the one computed at the subsequent instant. If the activation is equal, the neuron carries out no activity, otherwise it propagates the difference in activation, multiplied by the interconnection weights, to the neurons it is connected to.

6 Claims, 1 Drawing Sheet k
M1k
M2k
wk1
M1i
M2i
i

METHOD OF SPEEDING UP THE EXECUTION OF NEURAL NETWORKS FOR CORRELATED SIGNAL PROCESSING

FIELD OF THE INVENTION

The present invention relates to automatic signal recognition systems and more particularly to a method of speeding up the execution of neural networks to process correlated signals.

BACKGROUND OF THE INVENTION

A neural network is a parallel processing model reproducing, in extremely simplified form, the organization of cerebral cortex. A neural network comprises multiple processing units, known as neurons, strongly interconnected by means of links of various intensities, called synapses or interconnection weights.

Neurons in general are arranged in a multi-layer structure, with an input level, one or more intermediate levels and an output level. Starting from the input units, which receive the signal to be processed, processing propagates to the subsequent levels of the network up to the output units, which provide the result. A neural network is not programmed, but it is trained by means of a series of examples of the phenomenon to be modelled. Various embodiments of neural networks are described, for instance, in the book by D. Rumelhart "Parallel Distributed Processing", Vol. 1 Foundations, MIT Press, Cambridge, Mass., 1986.

Neural network technology can be applied to many sectors, such as function estimation, audio and video signal processing and classification, automatic controls, forecasting and optimization, although it has problems stemming from the lack of means that are powerful enough in terms of processing power and speed. It is well known that the execution of a neural network, when it is carried out by emulation on a sequential processor, is very burdensome, especially in cases requiring networks with many thousands of weights. If the need arises to process, in real time, signals continuously varying with time, such as for example voice, video, sonar or radar signals, use of this technology takes on additional difficulties.

The known solutions to this problem have taken three routes.

The first is aimed at decreasing the network size by pruning weights and units, as described for example by R. Reed in "Pruning Algorithms—A Survey" in IEEE Transactions on Neural Networks, Vol. 4, no. 5, 1993. These methods, however, have limited effectiveness since the number of weights and units that can be pruned without degradation in performance is often very limited.

A second route is based on implementation of the neural network on a VLSI chip, by exploiting its intrinsic potential for parallelization. This method is, potentially, very promising, but it is not very mature yet. It also entails the use of specialized hardware, which is often very expensive and not easy to integrate with commercial processors.

A third route is the use of specialized hardware of the multi-processor type, by distributing the execution of the neural network among various processors. As in the previous case, this possible solution also requires non-standard hardware, which is costly and difficult to integrate with commercial platforms like personal computers or workstations.

SUMMARY OF THE INVENTION

The aforesaid drawbacks are obviated by a method of speeding up the execution of neural network for correlated signal processing, according to the present invention, which allows speeding up the execution of a wide class of neural networks to process sequential input signals evolving slowly through time, such as, for instance, voice, radar, sonar, video signals, and which requires no specialized, costly or hard to find hardware.

In particular, the object of the present invention is to provide a method of speeding up the execution of neural networks for correlated signal processing, wherein the network is made of neurons arranged in a layered structure comprising, from a bottom level to a top level, an input level, one or more intermediate levels and an output level, and the neurons in a level are connected to neurons in an immediately upper level by means of links of different intensities (synaptic weights). The execution of the neural network at a generic sampling instant comprises, at least for neurons in the intermediate level or levels, the steps of:

- computing and storing an activation value of the neuron at instant t;
- comparing the activation value at instant t with the activation value at a preceding sampling instant t−1 and computing the difference between these values; and
- propagating towards neurons in an immediately upper layer this difference, weighted by the synaptic weights of the links with the neurons in the upper layer, only if this difference exceeds a given threshold.

Advantageously, the at least one level is a level at which the activation values are quantized and the comparison is carried out on the quantized values. The activation difference is propagated whenever the quantized values at instants t and t−1 are not identical.

The execution of the neural network at instant t can comprise the following operations:

(a) for all input neurons j:

(a1) defining the activation $o_j(t)$ of the input neuron, equal to the $j^{th}$ value of the signal quantized at time t, after storing the previous activation value $o_j(t-1)$;

(a2) increasing, for each intermediate neuron m reached from neuron j, the total input $net_m$ by the contribution coming from the input neuron j, the contribution being equal to the difference $o_j(t)-o_j(t-1)$ multiplied by interconnection weight $w_{mj}$;

(b) for all intermediate neurons m:

(b1) computing a quantized activation value with the formula $o_m^{quant}(t-1)$;

(b2) if the quantized activation value $o_m^{quant}(t)=o_m^{quant}(t-1)$, performing no operation for neuron m, and passing to the subsequent neuron;

(b3) increasing, for each neuron k reached from neuron m, the total input $net_k$ by the contribution coming from neuron m, the contribution being equal to the difference $o_m^{quant}(t)-o_m^{quant}(t-1)$ multiplied by interconnection weight $w_{km}$; and (c) for all output neurons k, computing the exact activation with the formula $o_k=f(net_k)$ where f(x) is the sigmoid.

This sequence can be iterated for all sampled values of the correlated input signal.

Before starting network execution on a signal, the inputs can be initialized by setting $net_i=\theta_i$ for each network neuron, $\theta_i$ being a constant value for each neuron, which value is defined at the beginning and is not subsequently changed. The co-domain of the sigmoid can be quantized with a number of quantization steps ranging from 25 to 50.

BRIEF DESCRIPTION OF THE DRAWING

The above and other objects, features, and advantages will become more readily apparent from the following description, reference being made to the accompanying drawing in which.

SPECIFIC DESCRIPTION

The idea the method is based upon is the following: since the input signal is sequential and evolves slowly and continuously through time, it is not necessary to compute again all the activation values of all neurons for each input, but rather it is enough to propagate through the network the differences with respect to the previous input. That is, the operation does not consider the absolute neuron activation values at time t, but the differences with respect to activation values at time t−1. Therefore at any point of the network, if a neuron has at time t an activation that is sufficiently similar (preferably identical) to that of time t−1, then the neuron will not propagate any signal forward. Since the execution of the network is based on the elementary operation of propagating the activation value of each neuron, averaged by the synaptic weights, towards the subsequent neurons, it is readily understood that limiting such activity to just the neurons for which there is an appreciable change in activation level is quite important.

By exploiting this idea, the execution of the neural network can be speeded up by propagating significant activation differences, and this allows a saving of up to two thirds of execution time in case of speech recognition. This method requires a very small amount of auxiliary memory and it does not entail an appreciable degradation in performance, as has been experimentally verified.

Figure 1:
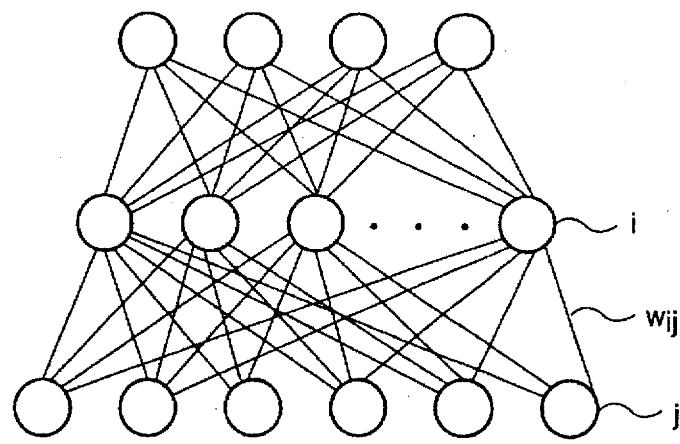
FIG. 1 depicts a Multi-layer Perceptron neural network.

FIG. 1 shows a Multi-layer Perception neural network like the one described in the already mentioned book by D. Rumelhart "Parallel Distributed Processing". The network input is a signal sampled in time and the network output are values corresponding to the desired processing, for instance input signal classification.

Each neuron of the intermediate and output levels computes its total input $net_i$ as a summation of the products of the activations $o_j$ of the lower level neurons by the interconnection weights $w_{ij}$, according to the formula $net_i = \Sigma_j o_{j \cdot wij}$, where $w_{ij}$ is the weight that connects neuron j to neuron i. Then the neuron computes its activation $o_i$ as a non-linear function of the total input according to the formula $o_i = 1/(1+e^{-net_i+\theta_i})$, where $\theta_i$ is a constant value, typical of neuron i. The above non-linear function is a sigmoid, which has an expression of the type $f(x)=1/(1+e^{-x+\theta})$ and a value between 0 and 1.

Figure 2:
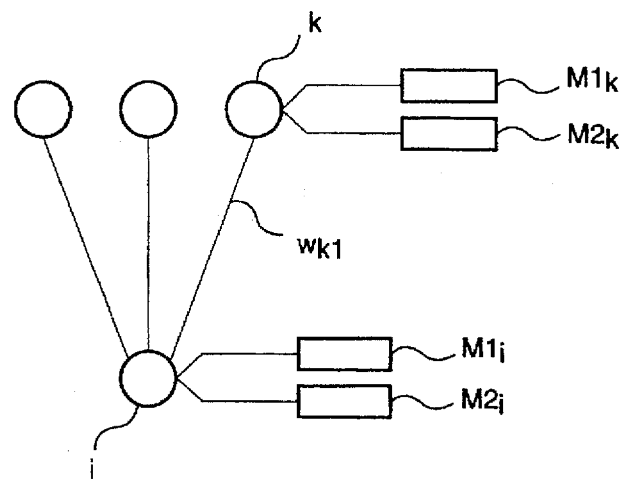
FIG. 2 depicts an individual neuron i with its forward connections.

FIG. 2 shows a single neuron i with its forward connections, along which it propagates the activation differences, and with its memory structures $\mathbf{M1}_i$ and $\mathbf{M2}_i$ required for the speeding up method. $\mathbf{M1}_i$ contains the activation value at time t, $o_i(t)$, as in conventional neural networks, and $\mathbf{M2}_i$ the value at the preceding time t−1, $o_i(t-1)$. The other neurons in the network also have similar memory structures, for example $\mathbf{M1}_k$ and $\mathbf{M2}_k$ for neuron k.

Figure 3:
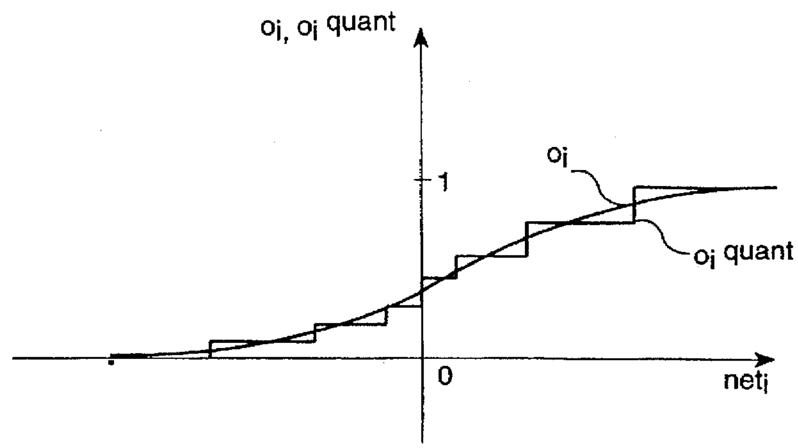
FIG. 3 depicts the quantization of the co-domain of the sigmoid transfer function of the neuron.

FIG. 3 depicts the quantization of the set of output values (co-domain) of the sigmoid transfer function of the neuron, with the purpose of quantizing the activation levels of the neurons, thus making it possible to recognise the condition of activation similarity at times t and t−1, required in order no signal is propagated. Preferably, the neurons do not propagate any signal when the quantized values at times t and t−1 are identical. The elementary operation to speed up execution of the network is thus accomplished.

We shall now describe in detail the method of speeding up the execution of the neural network.

The method requires storing the activation value of a neuron at time t−1 and comparing it with the one computed at time t. If the activation values differ by less than a predetermined threshold (preferably, are the same), the neuron carries out no activity, otherwise it propagates the activation difference, multiplied by the interconnection weights, to the neurons it is connected to. Since the activation of a neuron is a continuous non-linear function of its input, usually a sigmoid $f(x)=1/(1+e^{-x+\theta_i})$, it would be necessary to quantize the co-domain of such a function to a pre-determined number of values, in order the condition of activation identity can be actually recognized (FIG. 3). Quantization is generally carried out for the neurons of the intermediate level(s), so that the speeding up concerns such level(s).

This quantization of the sigmoid co-domain introduces a sort of quantization noise into the network, but since information is highly distributed, this error tends statistically to be compensated and it does not bring about an appreciable degradation in performance.

Obviously, the number of quantization values must be estimated empirically: the smaller it is, the more the method accelerates; however, it cannot be excessively small to avoid a degradation in performance. In the case of realistic Multi-layer Perceptron networks, with about 50,000–100,000 weights, this number can vary from about 25 to about 50.

We shall now describe in detail the execution of the neural network at generic time t, subdivided into the cycles on input neurons j, on intermediate neurons m and on output neurons k.

A) Cycle on input neurons:

1. for all input neurons j the following steps are carried out:

1.1 the activation $o_j(t)$ of the input neuron, equal to the $j^{th}$ value of the signal quantized at time t, is defined, after storing the previous activation value $o_j(t-1)$;

1.2 for each intermediate neuron m reached from neuron j, the total input $net_m$ is increased by the contribution coming from input neuron j, given by the difference $o_j(t)-o_j(t-1)$ multiplied by interconnection weight $w_{mj}$.

B) Cycle on intermediate neurons:

2. for all intermediate neurons m, the following steps are performed:

2.1 the quantized activation is computed with the formula $o_m^{quant}=f^{quant}(net_m)$, where $f^{quant}(x)$ is the sigmoid quantized on the co-domain, after storing the previous quantized activation $o_m^{quant}(t-1)$;

2.2 if $o_m^{quant}(t)=o_m^{quant}(t-1)$, nothing is done for neuron m, and the subsequent neuron is considered, thus accomplishing the basic speedingup operation; otherwise, the difference is propagated;

2.3 for each neuron k reached from neuron m, the total input $net_k$ is increased by the contribution coming from neuron m, which contribution is equal to the difference $o_m^{quant}(t)-o_m^{quant}(t-1)$ multiplied by interconnection weight $w_{km}$.

C) Cycle on the output neurons:

3. for all output neurons k. the exact activation is computed with the formula $$o_k=f(net_k) \text{ where } f(x) \text{ is the sigmoid.}$$

This method is repeated for all sampled values of the correlated input signal, from start time t=1 to end time t=T, where T constitutes the number of elements of the sampled input signal. Before starting to execute the network on a signal, values $net_i$ are initialised to $\theta_i$ for each neuron in the network, as in the difference propagation mechanism the constant value θ of each neuron is defined at the start and it is never altered thereafter.

The main advantages of the method are the following:

a. optimization is due to a conceptual modification of the execution of the network and not to a software optimization, so that the advantage is real and it can be transposed on any hardware platform (even on DSP processors);

b. the use of additional memory is of the order of the network units, i.e. of the neurons, and not of the order of the weights, so that it is very limited;

c. by appropriately choosing the quantization step of the co-domain of the sigmoid, it is possible to obtain remarkable reductions in execution time without appreciable losses in performance;

d. the method can be applied to all cases of sequential input with continuous dynamics and slow evolution (e.g. voice, video, sonar, medical signals); and e. in the worst case of complete and continuous variation in the input signal, the method converges to the limiting case of a standard execution of the neural network, without appreciable additional costs.

It is evident that what has been described is provided purely by way of non-limiting example. Variations and modifications are possible without departing from the scope of the invention.

We claim:

1. A method of speeding up execution of a neural network for correlated signal processing, wherein the network is made of neurons arranged in a layered structure from a bottom level to a top level, said layered structure having an input level, one or more intermediate levels and an output level, the neurons in each level being connected to neurons in an immediately upper level by means of links of different intensities (synaptic weights), execution of the neural network at a generic sampling instant t comprising, at least for neurons in the intermediate level or levels, the steps of:

computing and storing an activation value of the neuron at instant t;

comparing the activation value at instant t with the activation value at a preceding sampling instant t−1 and computing the difference between said values; and propagating towards neurons in an immediately upper layer said difference, weighted by the synaptic weights of the links with said neurons in the upper layer, only if said difference exceeds a given threshold.

2. The method of claim 1, wherein said at least one level is a level at which the activation values are quantized, said comparison is carried out on the quantized values and the activation difference is propagated whenever the quantized values at instants t and t−1 are not identical.

3. The method of claim 1, wherein the execution of the neural network at instant t comprises the following operations:

a) for all input neurons j:

a1) defining the activation $o_j(t)$ of the input neuron, equal to the $j^{th}$ value of the signal quantized at time t, after storing the previous activation value $o_j(t-1)$;

a2) increasing, for each intermediate neuron m reached from neuron j, the total input $net_m$ by the contribution coming from the input neuron j, said contribution being equal to the difference $o_j(t)-o_j(t-1)$ multiplied by interconnection weight $w_{mj}$;

b) for all intermediate neurons m:

b1) computing a quantized activation value with the formula $o_m^{quant}=f^{quant}(net_m)$, where $f^{quant}(x)$ is the sigmoid quantized on the co-domain, after storing the previous quantized activation value $o_m^{quant}(t-1)$.

b2) if the quantized activation value $o_m^{quant}(t)=o_m^{quant}(t-1)$, performing no operation for neuron m, and passing to the subsequent neuron;

b3) increasing, for each neuron k reached from neuron m, the total input $net_k$ by the contribution coming from neuron m, said contribution being equal to the difference $o_m^{quant}(t)-o_m^{quant}(t-1)$ multiplied by interconnection weight $w_{km}$; and c) for all output neurons k, computing the exact activation with the formula $o_k=f(net_k)$ where f(x) is the sigmoid.

4. The method of claim 3, steps (a) to (c) are iterated for all sampled values of the correlated input signal.

5. The method of claim 3, wherein before starting network execution on a signal, the inputs are initialized by setting $net_i=\theta_i$ for each network neuron, $\theta_i$ being a constant value for each neuron, which value is defined at the beginning and is not subsequently changed.

6. The method of claim 3, wherein the co-domain of the sigmoid is quantized with a number of quantization steps ranging from 25 to 50.

* * * * *